United States Patent
Parmar

(10) Patent No.: US 12,212,682 B2
(45) Date of Patent: Jan. 28, 2025

(54) METHOD OF PREVENTING CAPTURE OF AN AI MODULE AND AN AI SYSTEM THEREOF

(71) Applicants: Robert Bosch GmbH, Stuttgart (DE); Robert Bosch Engineering and Business Solutions Private Limited, Bangalore (IN)

(72) Inventor: Manojkumar Somabhai Parmar, Ahmedabad (IN)

(73) Assignees: Robert Bosch GmbH, Stuttgart (DE); Robert Bosch Engineering and Business Solutions Private Limited, Bangalore (IN)

(*) Notice: Subject to any disclaimer, the term of this patent is extended or adjusted under 35 U.S.C. 154(b) by 483 days.

(21) Appl. No.: 17/491,071

(22) Filed: Sep. 30, 2021

(65) Prior Publication Data

US 2023/0101547 A1    Mar. 30, 2023

(51) Int. Cl.
*H04L 9/32* (2006.01)
*H04L 41/16* (2022.01)

(52) U.S. Cl.
CPC .......... *H04L 9/3242* (2013.01); *H04L 9/3247* (2013.01); *H04L 41/16* (2013.01)

(58) Field of Classification Search
CPC ..... H04L 9/3242; H04L 9/3247; H04L 41/16; H04L 63/123
See application file for complete search history.

(56) References Cited

U.S. PATENT DOCUMENTS

| | | | |
|---|---|---|---|
| 10,764,294 B1* | 9/2020 | Wasiq | H04L 63/10 |
| 10,771,255 B1* | 9/2020 | Roth | H04L 9/0819 |
| 11,321,456 B2* | 5/2022 | Derks | G06N 7/01 |
| 2008/0243753 A1* | 10/2008 | Gormish | G06F 16/93 |
| 2012/0159175 A1* | 6/2012 | Yocom-Piatt | G06F 11/1453 713/176 |
| 2019/0095629 A1* | 3/2019 | Lee | G06Q 10/06 |
| 2019/0311277 A1* | 10/2019 | Kursun | G06N 3/08 |
| 2020/0234184 A1* | 7/2020 | Kesarwani | G06F 16/90335 |
| 2020/0242290 A1* | 7/2020 | Hamamura | G06F 30/32 |
| 2020/0342290 A1* | 10/2020 | Carothers | G06N 3/063 |
| 2021/0110066 A1* | 4/2021 | Liu | G06F 21/72 |
| 2022/0383417 A1* | 12/2022 | Cummings | G06Q 40/06 |
| 2023/0409756 A1* | 12/2023 | Baldwin | H04L 9/0877 |

* cited by examiner

*Primary Examiner* — Venkat Perungavoor
*Assistant Examiner* — Peiliang Pan
(74) *Attorney, Agent, or Firm* — Maginot, Moore & Beck LLP

(57) ABSTRACT

An AI system and a method of preventing capture of an AI module in the AI system is disclosed. The AI system includes an input interface, a signature verification module, an AI module configured to execute multiple AI models, a hash module, and a key generation module. A signature module and the key generation module provide an output to the user in response to a received input from the user. The AI module further includes an output interface configured to transmit an output response from the signature module to the user.

9 Claims, 2 Drawing Sheets

METHOD OF PREVENTING CAPTURE OF AN AI MODULE AND AN AI SYSTEM THEREOF

The disclosure of patent application no. IN 202041031987, filed on Jul. 27, 2020 in India, is incorporated herein by reference in its entirety.

FIELD

The disclosure relates to a method of preventing capture of an AI module in the AI system and an AI system thereof.

BACKGROUND

Now days, most of the data processing and decision making systems are implemented using artificial intelligence modules. The artificial intelligence modules use different techniques like machine learning, neural networks, deep learning etc.

Most of the AI based systems, receive large amounts of data and process the data to train AI models. Trained AI models generate output based on the use cases requested by the user. Typically the AI systems are used in the fields of computer vision, speech recognition, natural language processing, audio recognition, healthcare, autonomous driving, manufacturing, robotics etc. where they process data to generate required output based on certain rules/intelligence acquired through training.

To process the inputs, the AI systems use various models/algorithms which are trained using the training data. Once the AI system is trained using the training data, the AI systems use the models to analyze the real time data and generate appropriate result. The models may be fine-tuned in real-time based on the results.

The models in the AI systems form the core of the system. Lots of effort, resources (tangible and intangible), and knowledge goes into developing these models.

It is possible that some users may try to capture/copy/extract the model from AI systems. The user may use different techniques to capture the model from the AI systems. One of the simple techniques used by the user is where the user sends different queries to the AI system iteratively, using its own test data. The test data may be designed in a way to extract internal information about the working of the models in the AI system. The adversary uses the generated results to train its own models. By doing these steps iteratively, it is possible to capture the internals of the model and a parallel model can be built using similar logic. This will cause hardships to the original developer of the AI systems. The hardships may be in the form of business disadvantages, loss of confidential information, loss of lead time spent in development, loss of intellectual properties, loss of future revenues etc.

There are methods known in the prior arts to identify such attacks by the adversaries and to protect the models used in the AI system. The prior art US 2019/0095629 A1 discloses one such method.

The method disclosed in above prior art receives the inputs, the input data is processed by applying a trained model to the input data to generate an output vector having values for each of the plurality of pre-defined classes. A query engine modifies the output vector by inserting a query in a function associated with generating the output vector, to thereby generate a modified output vector. The modified output vector is then output. The query engine modifies one or more values to disguise the trained configuration of the trained model logic while maintaining accuracy of classification of the input data.

SUMMARY

According to an exemplary embodiment of the disclosure a method of preventing capturing of an AI module in an AI system includes receiving an input from a user through an input interface, the input including signature availability information and signature information; checking the signature availability information in the received input in a signature verification module; validating the signature information in the received input in the signature verification module; and transmitting the received input to the AI module on successful validation of the signature information in the signature verification module. The method further includes transmitting an output from the AI module to a hash module; transmitting the output from the AI module to a key generation module; receiving in the hash module the received input and the output transmitted from the AI module; receiving in a signature module, an output from the hash module and an output from the key generation module; signing the output from the hash module in the signature module; and transmitting to the user an output from the signature module through an output interface.

According to another exemplary embodiment of the disclosure, an AI system for preventing capturing of an AI module in the AI system includes an input interface, a signature verification module, an AI module, a hash module, a key generation module, a signature module, and an output interface. The input interface is configured to receive an input from a user. The signature verification module is configured to receive the input from the user, to check a signature availability, and to validate signature information in the received input from the user. The AI module is configured to execute multiple AI models and to receive the received input from the signature verification module. The hash module is configured to receive input from the AI module and to receive the received input from the user, the hash module is further configured to calculate a hash in response to the received input from the user and an output of the AI module. The key generation module is configured to receive an input from the AI module and to generate a key, the key is unique of each AI model in the AI module. The signature module is configured to receive an input from the hash module and the key generation module and to provide an output to the user in response to the received input from the user. The output interface is configured to transmit an output response from the signature module in the AI system to the user.

BRIEF DESCRIPTION OF THE DRAWINGS

Different modes of the disclosure are disclosed in detail in the description and illustrated in the accompanying drawing.

DETAILED DESCRIPTION

Figure 1:
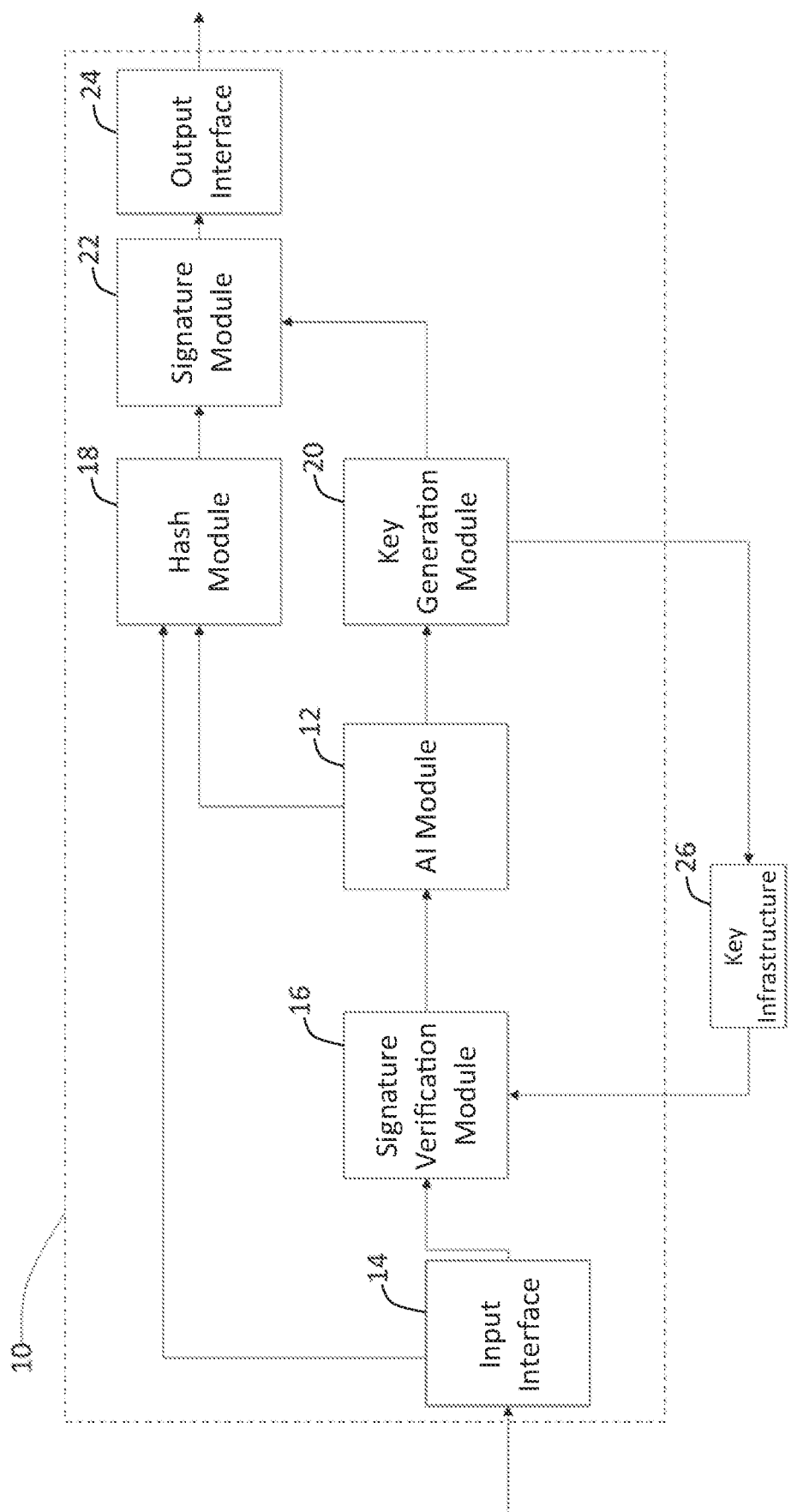
FIG. 1 illustrates a block diagram representative of the different building blocks of an AI system.

It is important to understand some aspects of artificial intelligence (AI) technology and artificial intelligence (AI) based systems or artificial intelligence (AI) system. This disclosure covers an aspect related to the prevention of capturing of the AI module in an AI system.

Some important aspects of the AI technology and AI systems can be explained as follows. Depending on the architecture of the implements AI system may include many components. One such component is an AI module. An AI module with reference to this disclosure can be explained as a component which, runs a model. A model can be defined as reference or an inference set of data, which is used different forms of correlation matrices. Using these models and the data from these models, correlations can be established between different types of data to arrive at some logical understanding of the data. A person skilled in the art would be aware of the different types of AI models such as linear regression, naïve bayes classifier, support vector machine, neural networks and the like. It must be understood that this disclosure is not specific to the type of AI model being executed in the AI module and can be applied to any AI module irrespective of the AI model being executed. A person skilled in the art will also appreciate that the AI module may be implemented as a set of software instructions, combination of software and hardware or any combination of the same.

Some of the typical tasks performed by AI systems are classification, clustering, regression etc. Majority of classification tasks depend upon labeled datasets; that is, the data sets are labelled manually in order for a neural network to learn the correlation between labels and data. This is known as supervised learning. Some of the typical applications of classifications are: face recognition, object identification, gesture recognition, voice recognition etc. Clustering or grouping is the detection of similarities in the inputs. The cluster learning techniques do not require labels to detect similarities. Learning without labels is called unsupervised learning. Unlabeled data is the majority of data in the world. One law of machine learning is: the more data an algorithm can train on, the more accurate it will be. Therefore, unsupervised learning models/algorithms has the potential to produce accurate models as training dataset size grows.

As the AI module forms the core of the AI system, the module needs to be protected against attacks. Attackers attempt to attack the model within the AI module and steal information from the AI module. The attack is initiated through an attack vector. In the computing technology a vector may be defined as a method in which a malicious code/virus data uses to propagate itself such as to infect a computer, a computer system or a computer network. Similarly an attack vector is defined a path or means by which a hacker can gain access to a computer or a network in order to deliver a payload or a malicious outcome. A model stealing attack uses a kind of attack vector that can make a digital twin/replica/copy of an AI module. This attack has been demonstrated in different research papers, where the model was captured/copied/extracted to build a substitute model with similar performance.

The attacker typically generates random queries of the size and shape of the input specifications and starts querying the model with these arbitrary queries. This querying produces input-output pairs for random queries and generates a secondary dataset that is inferred from the pre-trained model. The attacker then take this I/O pairs and trains the new model from scratch using this secondary dataset. This is black box model attack vector where no prior knowledge of original model is required. As the prior information regarding model is available and increasing, attacker moves towards more intelligent attacks. The attacker chooses relevant dataset at his disposal to extract model more efficiently. This is domain intelligence model based attack vector. With these approaches, it is possible to demonstrate model stealing attack across different models and datasets.

As mentioned above an attacker is directly able to send a random query to a model with the expectation of some out. One object of the claimed concept in this disclosure is not to allow the attacker/user any access to the AI model in the AI module with proper verification of the user information. Another object of the claimed concept is this disclosure is that the output from the AI module is signed and specifically related only to an authenticated user. Thus if the user is not authenticated then no output will be sent to the user.

It must be understood that the disclosure in particular discloses a methodology to prevent capturing of an AI module in an AI system. While these methodologies describes only a series of steps to accomplish the objectives, these methodologies are implemented in AI system, which may be a combination of hardware, software and a combination thereof.

It must be understood that each of the building blocks of the AI system may be implemented in different architectural frameworks depending on the applications. In one embodiment of the architectural framework all the building block of the AI system are implemented in hardware i.e. each building block may be hardcoded onto a microprocessor chip. This is particularly possible when the building blocks are physically distributed over a network, where each building block is on individual computer system across the network. In another embodiment of the architectural framework of the AI system are implemented as a combination of hardware and software i.e. some building blocks are hardcoded onto a microprocessor chip while other building block are implemented in a software which may either reside in a microprocessor chip or on the cloud.

FIG. 1 illustrates a block diagram representative of the different building blocks of an AI system. An AI system (10) adapted to prevent capturing of an AI module (12) in the AI system (10). The AI system (10) comprises: an input interface (14) adapted to receive an input from a user; a signature verification module (16) adapted to receive an input from a user and check signature availability and validate signature information in the input received from the user; an AI module (12) adapted to executes multiple AI models. The AI module receives input from the signature verification module (16), a hash module (18) adapted to receive input from the AI module (12) and receive input from a the user, the hash module (18) adapted to calculate a hash in response to the received input from the user and output of the AI module (12); a key generation module (20) adapted to receive an input from the AI module (12) and generate a key. The key is unique of each AI model in the AI module (12); a signature module (22) adapted to receive input from the hash module (18) and the key generation module (20) and provide an output to the user in response to the received input from said user and an output interface (24) adapted to transmit an output response from signature module (22) in the AI system (10) to said user. The AI system (10) communicates with at least one key infrastructure (26).

Figure 2:
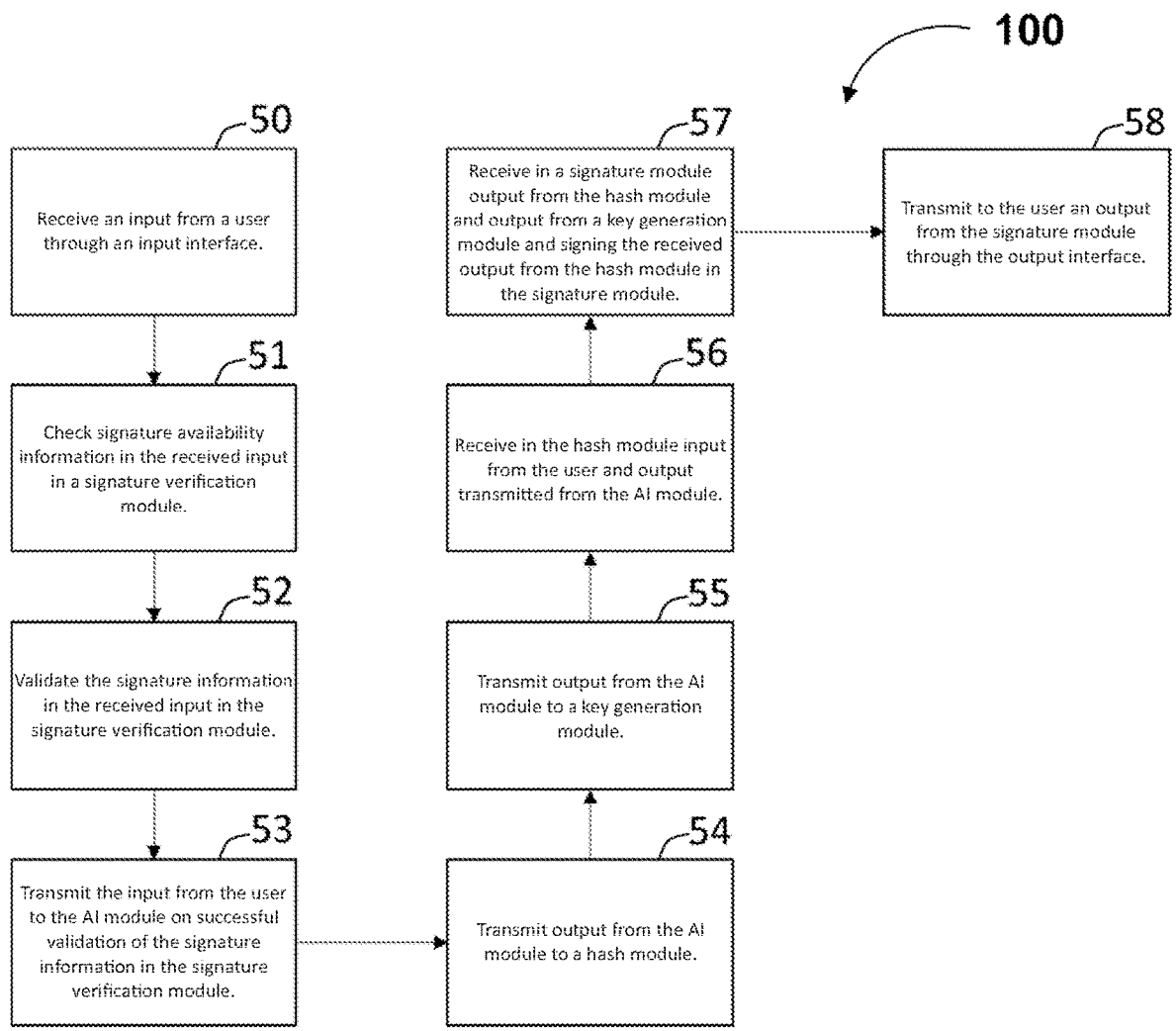
FIG. 2 illustrates a representative flowchart of the different step in the method 100 of preventing capture of an AI module in an AI system

FIG. 2 illustrates a representative flowchart of the different step in the method 100 of preventing capture of an AI module in an AI system. The method (100) of prevent capturing of an AI module (12) in an AI system (10), the method comprises the following steps: receiving (50) an input from a user through an input interface (14); checking (51) signature availability information in the received input in a signature verification module (16); validating (52) the signature information in the received input in the signature verification module (16); transmitting (53) the input from the user to the AI module (12) on successful validation of the signature information in the signature verification module (16); transmitting (54) output from the AI module (12) to a hash module (18); transmitting (55) output from the AI module (12) to a key generation module (20); receiving (56) in the hash module input from the user and output transmitted (54) from the AI module (12); receiving (57) in a signature module (22) output from the hash module (18) and output from a key generation module (20) and signing the received output from the hash module (18) in the signature module (22); and transmitting (58) to the user an output from the signature module (22) through the output interface (24).

During checking (51) signature availability information in the received input, if signature information is not available then any further communication between user and AI system (10) is terminated The checking of signature availability is implemented in said signature verification module (16). While validating (52) signature information, if signature validation is not successful then further communication between user and AI system (10) is terminated. This validating signature information is implemented in said signature verification module (16). The AI system (10) communicates with a key infrastructure (26) for signature validation. Thus in these steps it is ensured that the only an authenticated user who has a signature and more particularly a authentic signature which can be validated by the AI system is allowed to proceed further to interact with the AI module 12 in the AI system 10.

For validating (52) signature information in the signature verification module (16), a first input is the input from the user and a second input is a combination of user id and a certificate from a key infrastructure (KI) (26). The KI (26) adapted to be in communication with said AI system (10). The advantage of using a KI is that it serves as a central ledger for a system about authentic users. It can be used by anyone (user, system, devices) to establish a trust mechanism and validate it.

The hash module (18) receives the user input and output of the AI module (12). The hash module (18) is adapted calculate a hash value in response to the received user input and said output of said AI module (12). The key generation module (20) in the AI system (10) receives input from the AI module (12) and generates a first output adapted to be used as a key for signing the output of the AI module (12) in the signature module (14) and a second output transmitted to the key infrastructure (26).

During runtime and during the working of the AI system 10 in accordance with this disclosure, the AI system may receive an input through the input interface 14. The input is received by the AI module 12. The signature verification module ensures that only authenticated user which have a signature and which have a signature that can be validated is allowed to communicate further with the AI system and the AI module 12. Thus this kind of methodology does not allow any information from a non authentic or non validated source to be sent to the AI module, thus an attacker will not be able gain access to the AI system. This would mean that the attacker would first need to be able to generate and use a signature which can be validated by the AI system 10 of this disclosure. Using this type of a method of allowing only authenticated and validated user to interact with the AI system would have the advantage that no additional access control strategies are required to protect the AI system from attack.

As a further step it is also possible to flag the user based on the number times input is received without a signature or an input in received with a non-validatable input If it was first time attacker, the user may be locked out temporarily. If the attacker is habitual attacker then a stricter locking steps may be suggested.

It must be understood that the AI system as disclosed through the representation shown in FIG. 1 and FIG. 2 are only illustrative and do not limit the scope of the disclosure from the perspective of the location of the various building blocks of the AI system 10. It is envisaged the position of the building blocks of the AI system can be changed and these are within the scope of this disclosure. The scope of this disclosure is only limited from the perspective of the method steps as disclosed. The implementation of the each of the building blocks of the AI system 10 can be done in any form which may be hardware, software or a combination of hardware and software.

What is claimed is:

1. A method of preventing capturing of an AI module in an AI system, the method comprising:
   receiving an input from a user through an input interface, said user input including signature availability information and signature information;
   checking said signature availability information in said user input in a signature verification module;
   validating said signature information in said user input in said signature verification module;
   transmitting said user input to said AI module on successful validation of said signature information in said signature verification module;
   transmitting an output from said AI module to a hash module;
   transmitting said output from said AI module to a key generation module;
   receiving in said hash module said user input and said output from said AI module;
   receiving in a signature module, an output from said hash module and an output from the key generation module;
   signing said output from said hash module in said signature module; and
   transmitting to the user an output response from said signature module through an output interface.

2. The method as claimed in claim 1, wherein:
   during said checking signature availability information in said user input, when said signature information is not available further communication between the user and said AI system is terminated, and
   said checking of said signature availability information is implemented in said signature verification module.

3. The method as claimed in claim 1, wherein:
   during said validating said signature information, when said signature validation is unsuccessful further communication between the user and said AI system is terminated, and
   said validating said signature information is implemented in said signature verification module.

4. The method as claimed in claim 1, wherein said AI system communicates with a key infrastructure for said signature information validation.

5. The method as claimed in claim 1, wherein:
   said validating said signature information in said signature verification module comprises inputting a first input from the user and a second input,
   said second input is a combination of user metadata and a certificate from a key infrastructure, and
   said key infrastructure is configured for communication with said AI system.

6. The method as claimed in claim 1, wherein:
said hash module receives said user input from the user and said output of said AI module, and
said hash module is configured to calculate a hash value in response to said user input and said output of said AI module.

7. The method as claimed in claim 1, wherein said key generation module receives said output from said AI module and generates (i) a first output configured as a key for signing said output of said AI module in said signature module, and (ii) a second output transmitted to a key infrastructure.

8. An AI system for preventing capturing of an AI module in the AI system, the AI system comprising:
   an input interface configured to receive a user input from a user;
   a signature verification module configured to receive said user input via the input interface, to check a signature availability, and to validate signature information in said user input;
   an AI module configured to execute multiple AI models and to receive said user input from said signature verification module;
   a hash module configured to receive an output from said AI module and to receive said user input, said hash module further configured to calculate a hash in response to said user input and said output of said AI module;
   a key generation module configured to receive said output from said AI module and to generate a key, said key is unique of each AI model in said AI module;
   a signature module configured to receive an output from said hash module and an output from said key generation module and to provide an output response to the user in response to said user input; and
   an output interface configured to transmit said output response from said signature module in said AI system to the user.

9. The AI system as claimed in claim 8, wherein said AI system communicates with at least one key infrastructure.

\* \* \* \* \*